Oct. 21, 1941.    M. GRABAU    2,260,220
VARIABLE DENSITY WINDOW
Filed April 3, 1941    2 Sheets-Sheet 1
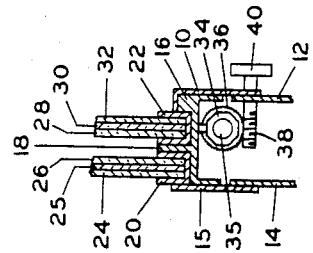
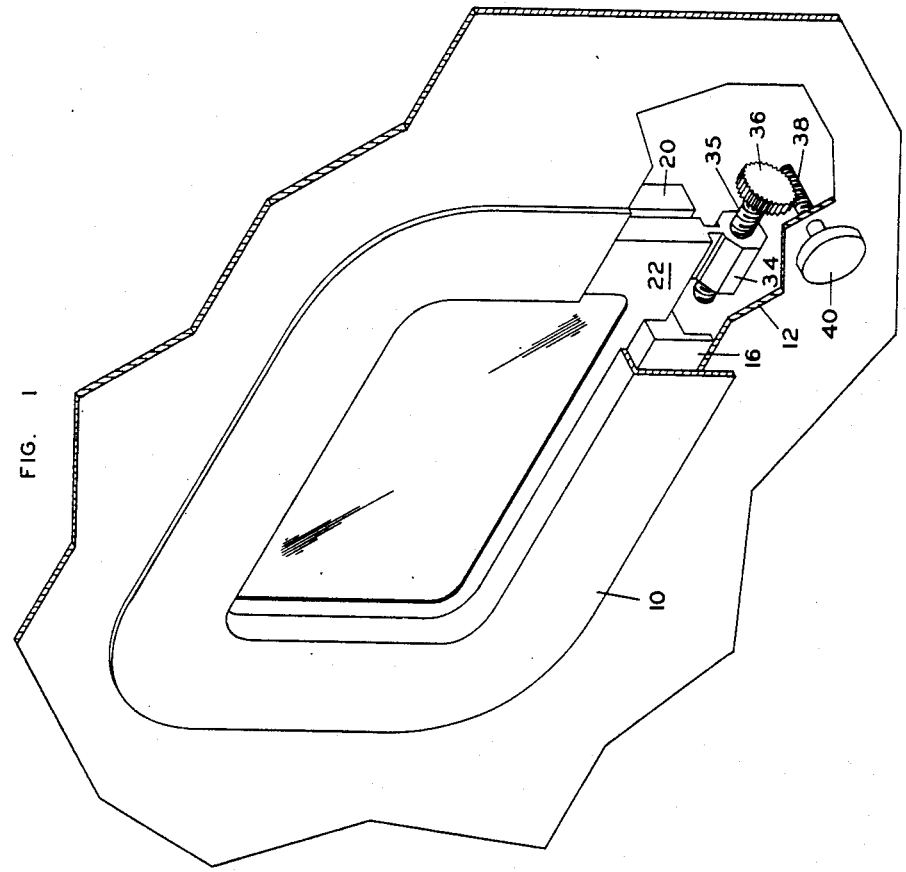
INVENTOR.
Martin Grabau
BY Donald C. Brown
Attorney Oct. 21, 1941.   M. GRABAU   2,260,220
VARIABLE DENSITY WINDOW
Filed April 3, 1941   2 Sheets-Sheet 2
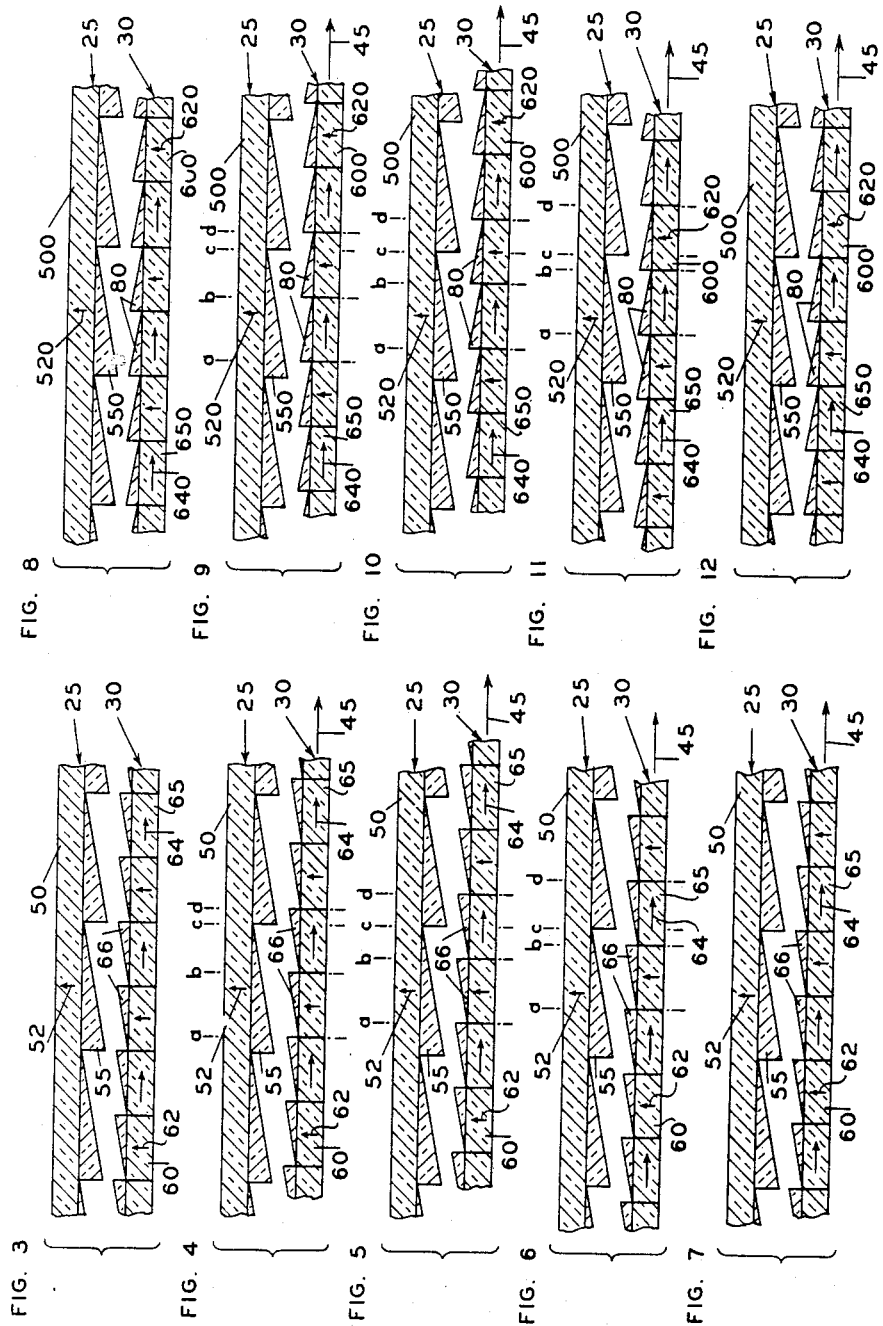

Patented Oct. 21, 1941

2,260,220

UNITED STATES PATENT OFFICE 2,260,220

VARIABLE DENSITY WINDOW

Martin Grabau, Cambridge, Mass., assignor to Polaroid Corporation, Dover, Del., a corporation of Delaware Application April 3, 1941, Serial No. 386,691

7 Claims. (Cl. 88—65)

This invention relates to variable density windows.

It is one object of the invention to provide a a novel form of variable density window and viewing device wherein it is possible to vary uniformly the intensity of the light transmitted from a predetermined minimum to a predetermined maximum.

Another object of the invention is to provide such a variable density window comprising a plurality of parallel light-polarizing elements of which at least one is movable linearly with respect to the other to vary the amount of light transmitted.

A further object of the invention is to provide such a variable density window wherein one polarizing element is composed of a homogeneous sheet of polarizing material and the other polarizing element is composed of a plurality of parallel strips of polarizing material, adjacent ones of which have their transmission axes relatively perpendicular, each of said polarizers being provided on the surface adjacent the other with a multiplicity of graded wave retardation devices which are adapted to supplement or complement each other and thus provide a predetermined, variable retardation device between the two polarizers and dependent upon the relative positions thereof with respect to each other.

Others objects and advantages will in part appear and in part be pointed out in the course of the following description of one embodiment of the invention which is given as a non-limiting example in connection with the accompanying drawings, in which:

Figure 1 is a perspective view showing a variable density window embodying a form of the invention, the view being partly broken away to show means for controlling the movable elements;

Figure 2 is a detailed, sectional view showing more clearly the construction of the window and of the control means therefor;

Figures 3–7 are detailed, diagrammatic views in horizontal cross-section illustrating the operation of one form of the window shown in Fig. 1, Fig. 3 showing the transmission position of said window, Fig. 7 showing the extinction position, and Figs. 4–6 showing intermediate positions; and Figures 8–12 are views similar to Figs. 3–7 respectively, showing the operation of a modification of the window shown in Fig. 1.

Referring to Figs. 1 and 2, element 10 represents a conventional frame mounted to surround a window aperture in wall 12, which may for example be the inside wall of a railroad vehicle or the like, the outer wall and outer frame being indicated at 14 and 15 respectively. Within frames 10 and 15 is positioned a member 16 provided with a projecting tongue 18 which cooperates with frames 10 and 15 to form a plurality of channels adapted to receive window frames 20 and 22. As shown in Fig. 2, the window element in frame 20 comprises a central layer 25 between a pair of layers 24 and 26 of glass or other transparent plastic and the window element in frame 22 similarly comprises a central layer 30 mounted between glass or other plastic layers 28 and 32. Each of layers 25 and 30 comprises polarizing elements of special polarizing properties combined with wave retardation elements, and their construction and characteristics will be described in more detail hereinafter.

In the illustrated embodiment of the invention, window frame 20 is fixedly mounted, but window frame 22 is mounted for sliding movement within its supporting channel in element 16. In accordance with the invention, suitable means are provided for controlling this movement. An example of such means is shown in Figs. 1 and 2 as comprising a lug or nut 34 on frame 22 adapted to receive a screw or bolt 35, which may be mounted in any suitable way within walls 12 and 14. Bolt 35 is in turn controlled by gear 36 meshing with worm 38 journaled in wall 12 and provided with a suitable control knob 40.

It will be seen, therefore, that rotation of knob 40 in either direction will cause bolt 35 to rotate and cause the slidable window element to move linearly with respect to the fixed window element. In accordance with the invention, this movement will result in a variation in the amount of light transmitted by the window as a whole, and the reason for this result will be apparent upon reference to Figs. 3–12. It is of course understood that the above control means are given only as an illustrative example, and that the invention is in no way to be construed as limited to such a construction.

Referring to Fig. 3, element 25 represents the central layer in the fixed window, and element 30 represents the central layer in the movable element. Layer 25 is represented as comprising in part a sheet 50 of polarizing material of substantially uniform polarizing properties. Said sheet is preferably positioned with its transmission axis vertical, i. e. perpendicular to the plane of the sheet of the drawing, as is indicated by short arrow 52. This position of sheet 50 with respect to its transmission axis is preferred for the reason that it enables the sheet to block horizontally vibrating reflected light which tends to produce glare.

Layer 30 is represented as comprising in part a multiplicity of vertical, parallel strips of polarizing material of uniform polarizing properties. These strips are preferably of substantially equal width and so arranged that adjacent strips have their transmission axes relatively perpendicular. For example, strips 60 may be considered as having their transmission axes vertical, i. e. parallel to the transmission axis of sheet 50, as is indicated by the short arrows 62, and strips 65 may be considered as having their transmission axes horizontal, i e. parallel to the plane of the sheet of the drawing, as is indicated by the relatively long arrows 64.

It must be understood that for purposes of illustration Figs. 3-12 are highly exaggerated and diagrammatic. Polarizers having the properties of element 30, however, may be formed in a number of ways, as for example by laminating separate strips of sheet polarizing material to a common backing and arranging adjacent strips with their transmission axes relatively perpendicular. Another suitable method is to orient the molecules of two sheets of suitable plastic material, laminating the two sheets together with their respective directions of orientation relatively perpendicular, and then treating such sheets in such manner as to render alternate strips thereof light-polarizing.

Suitable materials for use in the latter method are sheets of a transparent, linear, high polymeric plastic the molecules of which contain hydroxyl groups, and examples include polyvinyl alcohol, polyvinyl acetal and regenerated cellulose. The preferred material is polyvinyl alcohol, and the molecules therein may be oriented satisfactorily by stretching a cast sheet of the material. Two such stretched sheets may then be laminated together with their stretch axes relatively perpendicular and each surface of the resulting sheet may then have alternate strips stained or dyed with a neutral dichroic dye as from a matrix such as a wash-off relief, the stained strips of each side being separated by unstained strips of equal width and being positioned to coincide with and overlie the unstained strips on the other surface.

Suitable neutral dichroic dyes or stains for this process include dichroic cotton dyes and solutions containing tri-iodide ions, and sheets may be prepared by this method of such thinness that their polarizing properties will be substantially the same as those indicated in the drawing, even though adjacent polarizing strips are on opposite surfaces of the sheet.

Bonded to each of the component strips of polarizer in layer 30, on the surface thereof adjacent layer 25, is a retardation element 66. Each said retardation element is preferably positioned with a principal vibration direction at an angle of substantially 45° to the transmission axes of strips 60 and 65. In the preferred embodiment of the invention, each of strips 66 is of such varying thickness or birefringence that it will impart to one component of a beam of polarized light transmitted thereto, for example by polarizing element 50, a relative retardation with respect to the other component varying from one edge to the other edge by a half wavelength. This property is illustrated in the drawing by showing each of said elements as of wedge shape. It will be seen further that said wedges are so arranged that the low retardation edge of each is adjacent the high retardation edge of the adjacent strip.

Bonded to the surface of polarizer 50 adjacent layer 30 is a multiplicity of vertical, parallel wave retardation elements 55, each of which elements is positioned with a principal vibration direction substantially parallel to the corresponding principal vibration direction of the elements 66, and at an angle of substantially 45° to the transmission axis of polarizer 50. Each of elements 55 is approximately twice as wide as each of elements 66. In the preferred embodiment of the invention, each of strips 55 is of such varying birefringence or thickness that it will impart to one component of a beam of polarized light transmitted thereto a relative retardation with respect to the other component varying from one edge to the other edge by substantially a full wavelength. This property is illustrated in the drawing by showing each of said elements as of wedge shape. In the embodiment of the invention shown in Figs. 3-7, elements 55 and 66 may be of the same sign of birefringence, in which case their corresponding principal vibration directions should be substantially parallel, or each set of said elements may be of opposite signs of birefringence, in which case their corresponding principal vibration directions should be relatively perpendicular. In either case it will be noted that the direction of variation in one set of wedges will be opposite to that in the other said set.

Elements having properties such as have been described in connection with wedges 55 and 66 may be made of any suitable birefringent material such, for example, as Cellophane, cellulose acetate, polyvinyl alcohol or the like, either in wedge shape or by submitting the material to a differential strain which will produce the desired varying birefringence. Elements 55 and 66 may be positioned in spaced relation to the polarizing elements or may be bonded individually, or as a preassembled sheet, to the polarizing elements with which they are associated. The relative retardation imparted by each of wedges 66 preferably varies from approximately zero adjacent one edge to substantially a half wave adjacent the other edge, in which case the retardation imparted by each of wedges 55 preferably varies from approximately zero adjacent one edge to substantially a full wavelength adjacent the other edge. It will be understood, however, that essentially the same conditions will exist if the retardation adjacent one edge of wedges 66 differs from that adjacent the other edge by any uneven number of half waves, provided the retardation imparted by each of wedges 55 varies by twice said amount.

As is pointed out above, Fig. 3 shows the position of maximum transmission of the two elements comprising the variable density window of this invention, and in describing the operation of said window it will be assumed that the relative retardation imparted by each of wedges 66 varies from zero to a half wave and that imparted by wedge 55 varies from zero to a full wave. In the position shown in Fig. 3, light incident on each of strips 60 is polarized to vibrate vertically, that is to say, perpendicular to the plane of the sheet of the drawing. It then passes through one of wedges 66 and the coincident part of one of wedges 55, which part will be seen to be the thicker half of wedge 55, that is to say, that part of said wedge which imparts a relative retardation varying from a half wave to a full wave. It follows that the combined action of each of said wedges 66 and thicker halves of wedges 55 will impart a retardation of a full wave to one component of the light transmitted by each of strips 60. Accordingly said light will have its vibration direction rotated through 180° and will therefore emerge vibrating vertically, or parallel to the transmission axis of polarizer 50 and will accordingly be transmitted thereby.

At the same time, light transmitted by each of polarizing strips 65 will be polarized to vibrate horizontally, that is to say, parallel to the plane of the sheet of the drawings. Each of the wedges 66 associated with strips 65 coincides with the thinner end of one of wedges 55, that is to say, that part imparting a relative retardation varying from zero to a half wave. Accordingly, said coincident wedges will combine to impart a relative retardation of a half wave to one component of polarized light transmitted by each of strips 65. This will result in rotation of the vibration direction of said light through 90°, i. e., twice the angular difference between the transmission axis of the incident polarizing element and a principal transmission direction of the birefringent elements. It follows that the result of this rotation will be to cause the light transmitted by each of strips 65 to vibrate parallel to the transmission axis of polarizer 50. Accordingly, light incident on either strips 60 or strips 65 will be transmitted by polarizer 50, and the same is true of light incident initially on polarizer 50, thus making the position shown in Fig. 3 the position of maximum transmission for the window.

The position of maximum extinction of the above window is shown in Fig. 7. Here movable window element 30 is to be understood as having been moved parallel with fixed window element 25 and laterally with respect thereto in the direction indicated by arrow 45 a distance equal to the width of one of polarizing strips 60, 65. In this position, light incident on each of strips 60 is polarized to vibrate vertically. However, each strip 60 and its associated wedge 66 have moved until said wedge now coincides with the low retardation half of one of wedges 55. Accordingly the coincident portions of said wedges impart a relative retardation of a half wave to one component of the beam polarized by each of strips 60, which results in a rotation of the vibration direction of said light through substantially 90°. This rotation causes said light to vibrate at right angles to the transmission axis of polarizer 50, and it is accordingly absorbed thereby. At the same time and in the same manner as described above in connection with strips 60 in Fig. 3, light polarized by transmission through each of strips 65 has its vibration direction rotated through 180°, and it accordingly emerges from wedges 55 vibrating at right angles to the transmission axis of polarizer 50 and is accordingly absorbed thereby. The same result is true of light passing the other way, that is to say, incident initially on polarizer 50, and it follows that the position shown in Fig. 7 is the position of maximum extinction for the window.

The intermediate position, that in which the combined elements transmit approximately one-half of the light transmitted in the position shown in Fig. 3, is illustrated in Fig. 5. In this figure movable window element 30 will be understood to have moved in the direction of arrow 45 a distance equal approximately to one-half the width of each of strips 60 and 65 from the position shown in Fig. 3. Each of vertically polarizing strips 60 overlies a corresponding strip $a$—$b$ of polarizer 50 also having its transmission axis vertical. The portion $a$—$b$ of each of wedges 55 lying between said coincident polarizing strips varies from approximately a quarter-wave plate at one edge to a three-quarter wave plate at the other edge. Accordingly each said portion will combine with its coincident wedge 66 to impart a relative retardation of three-quarter wavelengths to one component of a beam of polarized light and will accordingly cause said light to become circularly polarized.

Each of horizontally polarizing strips 65 overlies a corresponding strip $b$—$b$ of polarizer 50 having its transmission axis vertical. However, the portion $b$—$c$ of each of wedges 55 lying between said coincident polarizing areas varies from approximately zero retardation at one edge to substantially a quarter-wave plate at the other edge and overlies a complementary zero to quarter-wave portion of one of wedges 66. Similarly, each portion $c$—$d$ of one of wedges 55, which varies from approximately a full wave plate to a three-quarter wave plate, coincides with a complementary portion of one of wedges 66 which varies from a quarter-wave plate to a half-wave plate. It follows that the coincident portions $b$—$c$ of wedges 55 and 66 act as quarter-wave plates and the coincident portions $c$—$d$ of said wedges act as one and one-quarter wave plates, and accordingly that they act relatively uniformly to cause light transmitted by either of elements 50 or 65 to become circularly polarized. Essentially, therefore, the only difference between the action of the coincident portions $a$—$b$ and the coincident portions $b$—$b$ of wedges 55 and 66 is that one set produces clockwise polarized light and the other set produces counter-clockwise polarized light. There is no appreciable difference between the total transmission of parallel polarizers separated by a three-quarter wave plate and crossed polarizers separated by a one-quarter or one and one-quarter wave plate. In each case the light is converted by the retardation elements into circularly polarized light of which approximately one-half is transmitted by the second polarizing element. It follows, therefore, that the position shown in Fig. 5 is the position of median transmission of the window elements.

Fig. 4 illustrates a position of the window elements midway between that of maximum transmission shown in Fig. 3 and that of median transmission shown in Fig. 5. In this position, the portion $a$—$b$ of each of wedges 55 varies from a three-eighths wave plate to a seven-eighths wave plate. Accordingly, the total relative retardation imparted to one component of a beam of polarized light by the portion $a$—$b$ of each wedge 55 and its coincident wedge 66 will be approximately seven-eighths of a wavelength. Similarly, it will be seen that the total relative retardation produced by the coincident portions $b$—$c$ of each of wedges 55 and 66 will be three-eighths of a wavelength, and that produced by the coincident portions $c$—$d$ will be one and three-eighths wavelengths. In the area between the lines $a$ and $b$ the polarizers have their transmission axes parallel, but in the area between the lines $b$ and $d$ the polarizing elements have their transmission axes crossed. Under these circumstances, the light transmitted through the area between the lines a and b will be substantially equal to the light transmitted through the area between the lines b and d, and it will be less than the light transmitted in the position shown in Fig. 3 and greater than that transmitted in the position shown in Fig. 5.

Fig. 6 illustrates a position of the window elements similar to that shown in Fig. 4 but midway between the median transmission position in Fig. 5 and the maximum extinction position shown in Fig. 7. In this position the portion a—b of each of wedges 55 varies from a one-eighth wave plate to a five-eighths wave plate. Accordingly, the total relative retardation imparted to one component of a beam of polarized light by the portion a—b of each wedge 55 and its coincident wedge 66 will be approximately five-eighths of a wavelength. Similarly it will be seen that the total relative retardation produced by the coincident portions b—c of each of wedges 55 and 66 will be one-eighth of a wavelength, and that produced by coincident portions c—d will be one and one-eighth wavelengths. As was explained above in connection with Fig. 4, the light transmitted through the parallel polarizers separated by a five-eighths wave plate and the crossed polarizers separated by a one-eighth or one and one-eighth wave plate will be substantially equal, and it will be less than that transmitted in the position shown in Fig. 5 and greater than that transmitted in the position shown in Fig. 7.

It is thus apparent that in any position of the element 30 with respect to the element 25 the light transmitted by the device is substantially uniform over its entire area. Striations are avoided and the effective density of the entire device may be uniformly and gradually varied from a maximum to a minimum. Variations in the density or in the intensity of transmitted light are substantially uniform over the entire area of the window aperture. It will be understood that the operation of the window is substantially the same whether the two sets of birefringent elements are of the same sign of birefringence with corresponding principal vibration directions parallel or of opposite signs of birefringence with corresponding vibration directions perpendicular, for the reason that in either case coincident pairs of elements will supplement each other.

It will be apparent also that the total movement of the movable element 30 need be no greater than that of one of the polarizing strips which in turn may be in the neighborhood of one-sixteenth of an inch or even less. It will be understood also that while one of the elements has been described as fixed and the other as movable, both may be movable in directions preferably opposite to one another, in which case each element need move only one-half the width of one of polarizing strips 60, 65.

Figs. 8-12 illustrate in the same manner as Figs. 3-7 the operation of a modification of the invention. In said modification, the birefringent elements associated with one of window elements 25 or 30 may be of the opposite sign of birefringement from those associated with the other said window element, in which case their corresponding principal vibration directions should be substantially parallel, or all of said birefringent elements may be of the same sign of birefringence, in which case one said set should be positioned with a principal vibration direction substantially perpendicular to the corresponding vibration direction of the other set. In either case it will be noted that the window elements are so positioned that the direction of variation in each set of wedges is the same and is accordingly the reverse of the arrangement shown in Figs. 3-7.

In Figs. 8-12, for example, polarizer 500 and wedges 550 may be assumed to be substantially the same as the corresponding elements in Figs. 3-7, and wedges 550 may, for example, be of positive birefringence. In this case, each of wedges 80 associated with polarizing strips 600 and 650 may be assumed to be of negative birefringence, that is to say, they produce rotation of the vibration direction of polarized light in a direction opposite the direction of rotation produced by each of wedges 550. The transmission axes of polarizers 500, 600 and 650 are indicated in the same manner as those of polarizers 50, 60 and 65. Arrows 520 and 620 represent vertical transmission axes, i. e. perpendicular to the plane of the sheet of the drawing, and arrows 640 represent horizontal transmission axes, i. e. parallel to the plane of the sheet.

The relative retardation imparted to one component of the beam of polarized light by each of wedges 80 and 550 may vary in any of the ways described above in connection with wedges 55 and 66, but for the purpose of illustration it will be assumed that each of wedges 80 varies from approximately zero at its thin edge to a half wave plate at its opposite edge and each of wedges 550 varies from approximately zero adjacent its thin edge to substantially a full wave at the other edge.

Fig. 8 shows the position of maximum transmission of the window. This results from the fact that each wedge 80 associated with one of polarizing strips 600 neutralizes the birefringence of the coincident area of each of wedges 550. Accordingly, light polarized by transmission through either polarizer 500 or 600 is caused to vibrate parallel to the transmission axis of the other polarizer and is accordingly transmitted thereby. At the same time, each wedge 80 associated with one of polarizing strips 650 differentially neutralizes its coincident area of one of wedges 550 and causes the latter to become a uniform half wave plate. Accordingly the vibration direction of light transmitted by each of strips 650 is rotated through 90° and thus vibrates parallel to the transmission axis of polarizer 500. Accordingly it will be seen that light incident on either of strips 600 or 650 will be transmitted by polarizer 500, and the same is true of light incident initially on polarizer 500, thus making the position shown in Fig. 8 the position of maximum transmission for the window.

In the case of the window shown in Figs. 3-7, it will be understood that the operation of the window shown in Figs. 8-12 is substantially the same, whether the two sets of birefringent elements are of opposite signs of birefringence with corresponding vibration directions parallel, or of the same sign of birefringence with corresponding vibration directions perpendicular, for the reason that in either case coincident pairs of said elements will differentially neutralize each other.

The position of maximum extinction of the above window is shown in Fig. 12. Here the action is the converse of that described in connection with Fig. 8. Each wedge 80 associated with one of polarizing strips 650 neutralizes its coincident area of a wedge 550 so that light transmitted by each of strips 650 emerges vibrating at right angles to the transmission axis of polarizer 500 and is absorbed thereby. Similarly each wedge 80 associated with one of polarizing strips 600 differentially neutralizes its coincident area of a wedge 550 and causes it to act as a uniform half wave plate, thus rotating the vibration direction of light transmitted by each of polarizing strips 600 through 90° and causing it to vibrate at right angles to the transmission axis of polarizer 500. Inasmuch, therefore, as light transmitted by either element 25 or 30 will be caused to vibrate at right angles to the transmission axes of the polarizers comprising the other said element, it follows that this is the position of maximum extinction of the window.

The operation of the above window in the positions shown in Figs. 9, 10 and 11 corresponds to the operation of the corresponding elements 25 and 30 in the positions described above and shown in Figs. 4, 5 and 6 respectively. Thus in Fig. 10, which shows the position of median transmission, each wedge 80 associated with one of strips 650 differentially neutralizes its corresponding area a—b of one of polarizers 550 and causes it to act as a uniform quarter-wave plate and produce circularly polarized light. Similarly the coincident areas b—c and c—d of each wedge 550 and 80 will act as uniform quarter-wave and three-quarter wave plates, respectively. As pointed out above, it is immaterial whether the polarizers be crossed or parallel when they are separated by quarter or three-quarter wave plates. In either case approximately half the initially polarized light is transmitted, and it follows that the position shown in Fig. 10 is that of median transmission for the window.

The same net result is accomplished in the positions shown in Figs. 9 and 11 and those shown in Figs. 4 and 6, respectively. In Fig. 9, the relative retardation imparted by the combined wedge portions a—b between crossed polarizers is three-eighths wavelengths and that produced by the combined wedge portions b—c and c—d between parallel polarizers is one-eighth and seven-eighths wavelengths, respectively, thus producing an over-all substantially equal transmission somewhat less than that of the position shown in Fig. 8 and more than that in the position shown in Fig. 10. Similarly in Fig. 11, the net retardation produced in the coincident wedge areas a—b between crossed polarizers is one-eighth wavelength and that produced in the coincident wedge areas b—c and c—d between parallel polarizers is three-eighths and five-eighths wavelengths, respectively. Thus in this position the result is uniform transmission somewhat less than that in the position shown in Fig. 10 and greater than that in the position shown in Fig. 12.

The device has been illustrated in Figs. 3–12 diagrammatically and has been described as though the birefringent elements were wedge-shaped. It will be understood that wedge-shaped elements need not be employed provided the birefringence is approximately of the character already described. The use of wedge-shaped elements, however, need not render difficult the production of laminated elements such as are shown and described, for example, in connection with Fig. 2. The adhesive employed in connection with the lamination may be of a character to fill the indentations and surface irregularities arising from the use of wedge-shaped birefringent strips. It will be understood further that the device of the invention will function adequately even though the birefringence of the elements employed departs slightly from the preferred conditions already described. If it appears, however, that the device transmits light to too appreciable an extent when in the position of maximum extinction, this difficulty may be overcome by using birefringent elements of anomalous birefringence, that is to say, elements wherein the effect of wavelength in determining the retardation is compensated by anomalous changes with respect to wavelength of the difference between the indices of refraction. All such modifications of the device are to be deemed to fall within the scope of the invention.

Furthermore, while the device has been described in connection with the use of polarizing strips which have their transmission axes vertical and horizontal, it is to be understood that other forms of devices may be employed. Polarizing strips 60 and 65 may be perpendicular but at angles of 45° to the horizontal, in which case the axis of polarizer 50 may be parallel to that of either set of strips, and this condition may be preferred. It is to be understood, furthermore, that any of the variations described in connection with the embodiment shown in Figs. 3–7 apply equally to the embodiment shown in Figs. 8–12.

Since certain changes may be made in the above article and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. A variable density window comprising, in combination, frame means providing a window aperture, a plurality of sheet-like, light-polarizing elements mounted in substantially parallel, superimposed relation within said frame and overlying said aperture, at least one of said elements being mounted for parallel, linear movement with respect to the other, one of said elements comprising a multiplicity of parallel strips of substantially uniform width comprising light-polarizing material, the transmission axes of adjacent strips being relatively perpendicular, a birefringent element positioned adjacent and substantially overlying that surface of each said strip which is adjacent the other polarizing element, each of said birefringent elements imparting to one component of a beam of polarized light incident thereon a relative retardation varying uniformly across the width thereof by an amount equal to an uneven number of half wavelengths, the other of said polarizing elements being of substantially uniform polarizing properties and positioned with its transmission axis respectively parallel and perpendicular to those of said polarizing strips, a multiplicity of birefringent elements positioned adjacent that surface of said polarizing element which is adjacent the other polarizing element, each of said second named birefringent elements being parallel to and of substantially twice the width of said first named birefringent elements and imparting to one component of a beam of polarized light incident thereon a relative retardation varying uniformly across the width thereof by an amount equal to twice the variation in said first named birefringent elements, the birefringent elements in each of said multiplicities having a principal vibration direction parallel to a corresponding principal vibration direction in the other elements in said multiplicity and at an angle of substantially 45° to the transmission axes of said polarizing elements, and means for moving said movably mounted element in a direction substantially at right angles to the length of said strip elements.

2. A variable density window comprising, in combination, frame means providing a window aperture, a plurality of sheet-like, light-polarizing elements mounted in substantially parallel, superimposed relation within said frame and overlying said aperture, at least one of said elements being mounted for parallel, linear movement with respect to the other, one of said elements comprising a multiplicity of parallel strips of substantially uniform width comprising light-polarizing material, the transmission axes of adjacent strips being relatively perpendicular, a birefringent element positioned adjacent and substantially overlying that surface of each said strip which is adjacent the other polarizing element, each of said birefringent elements imparting to one component of a beam of polarized light incident thereon a relative retardation varying substantially linearly from approximately zero adjacent one edge of said element to substantially one-half wavelength adjacent the other edge thereof, the other of said polarizing elements being of substantially uniform polarizing properties and positioned with its transmission axis respectively parallel and perpendicular to those of said polarizing strips, a multiplicity if birefringent elements positioned adjacent that surface of said polarizing element which is adjacent the other polarizing element, each of said second named birefringent elements being parallel to and of substantially twice the width of said first named birefringent elements and imparting to one component of a beam of polarized light incident thereon a relative retardation varying substantially linearly from approximately zero adjacent one edge to substantially one wavelength adjacent the other edge, the birefringent elements in each of said multiplicities having a principal vibration direction parallel to a corresponding principal vibration direction in the other elements in said multiplicity and at an angle of substantially 45° to the transmission axes of said polarizing elements, and means for moving said movably mounted element in a direction substantially at right angles to the length of said strip elements.

3. A variable density window comprising, in combination, frame means providing a window aperture, a plurality of sheet-like, light-polarizing elements mounted in substantially parallel, superimposed relation within said frame and overlying said aperture, at least one of said elements being mounted for horizontal, parallel, linear movement with respect to the other, one of said elements comprising a multiplicity of parallel, vertical strips of substantially uniform width comprising light-polarizing material, the transmission axes of adjacent strips being relatively perpendicular, a birefringent element positioned adjacent and substantially overlying that surface of each said strip which is adjacent the other polarizing element, each of said birefringent elements imparting to one component of a beam of polarized light incident thereon a relative retardation varying substantially linearly from approximately zero adjacent one edge of said element to substantially one-half wavelength adjacent the other edge thereof, the other of said polarizing elements being of substantially uniform polarizing properties and positioned with its transmission axis respectively parallel and perpendicular to those of said polarizing strips, a multiplicity of vertical, parallel birefringent elements positioned adjacent that surface of said polarizing element which is adjacent the other polarizing element, each of said second named birefringent elements being of substantially twice the width of said first named birefringent elements and imparting to one component of a beam of polarized light incident thereon a relative retardation varying substantially linearly across the width thereof from approximately zero adjacent one edge to approximately one wavelength adjacent the other edge, the birefringent elements in each of said multiplicities having a principal vibration direction parallel to a corresponding principal vibration direction in the other elements in said multiplicity and at an angle of substantially 45° to the transmission axes of said polarizing elements, and means for moving said movably mounted element.

4. A variable density window comprising, in combination, frame means providing a window aperture, a plurality of sheet-like, light-polarizing elements mounted in substantially parallel, superimposed relation within said frame and overlying said aperture, at least one of said elements being mounted for parallel, linear movement with respect to the other, one of said elements comprising a multiplicity of parallel strips of substantially uniform width comprising light-polarizing material, the transmission axes of adjacent strips being relatively perpendicular, a birefringent element positioned adjacent and substantially overlying that surface of each said strip which is adjacent the other polarizing element, each of said birefringent element imparting to one component of a beam of polarized light incident thereon a relative retardation varying substantially linearly from approximately zero adjacent one edge of said element to substantially one-half wavelength adjacent the other edge thereof, the other of said polarizing elements being of substantially uniform polarizing properties and positioned with its transmission axis respectively parallel and perpendicular to those of said polarizing strips, a multiplicity of birefringent elements positioned adjacent that surface of said polarizing element which is adjacent the other polarizing element, each of said second named birefringent elements being parallel to and of substantially twice the width of said first named birefringent elements and imparting to one component of a beam of polarized light incident thereon a relative retardation varying substantially linearly from approximately zero adjacent one edge to substantially one wavelength adjacent the other edge, all of said birefringent elements being of the same sign of birefringence, and each thereof having a principal vibration direction substantially parallel to a corresponding principal vibration direction in the other said elements and at an angle of substantially 45° to the transmission axes of said polarizing elements, the direction of said variation in retardation in one of said multiplicities of birefringent elements being opposite the direction of variation in retardation in the other said multiplicity, and means for moving said movably mounted element in a direction substantially at right angles to the length of said strip elements.

5. A variable density window comprising, in combination, frame means providing a window aperture, a plurality of sheet-like light-polarizing elements mounted in substantially parallel, superimposed relation within said frame and overlying said aperture, at least one of said elements being mounted for parallel, linear movement with respect to the other, one of said elements comprising a multiplicity of parallel strips of substantially uniform width comprising light-polarizing material, the transmission axes of adjacent strips being relatively perpendicular, a birefringent element positioned adjacent and substantially overlying that surface of each said strip which is adjacent the other polarizing element, each of said birefringent elements imparting to one component of a beam of polarized light incident thereon a relative retardation varying substantially linearly from approximately zero adjacent one edge of said element to substantially one-half wavelength adjacent the other edge thereof, the other of said polarizing elements being of substantially uniform polarizing properties and positioned with its transmission axis respectively parallel and perpendicular to those of said polarizing strips, a multiplicity of birefringent elements positioned adjacent that surface of said polarizing element which is adjacent the other polarizing element, each of said second named birefringent elements being parallel to and of substantially twice the width of said first named birefringent elements and imparting to one component of a beam of polarized light incident thereon a relative retardation varying substantially linearly from approximately zero adjacent one edge to substantially one wavelength adjacent the other edge, all of said birefringent elements being of the same sign of birefringence, each thereof having a principal vibration direction substantially parallel to a corresponding principal vibration direction in the other said elements in the same multiplicity and substantially perpendicular to a corresponding principal vibration direction in the said elements in the other said multiplicity, said vibration direction being at an angle of substantially 45° to the transmission axes of said polarizing elements, the direction of said vibration in retardation in both said multiplicities of birefringent elements being the same, and means for moving said movably mounted element in a direction substantially at right angles to the length of said strip elements.

6. A variable density window comprising, in combination, frame means providing a window aperture, a plurality of sheet-like, light-polarizing elements mounted in substantially parallel, superimposed relation within said frame and overlying said aperture, at least one of said elements being mounted for parallel, linear movement with respect to the other, one of said elements comprising a multiplicity of parallel strips of substantially uniform width comprising light-polarizing material, the transmission axes of adjacent strips being relatively perpendicular, a birefringent element positioned adjacent and substantially overlying that surface of each said strip which is adjacent the other polarizing element, each of said birefringent elements imparting to one component of a beam of polarized light incident thereon a relative retardation varying substantially linearly from approximately zero adjacent one edge of said element to substantially one-half wavelength adjacent the other edge thereof, the other of said polarizing elements being of substantialy uniform polarizing properties and positioned with its transmission axis respectively parallel and perpendicular to those of said polarizing strips, a multiplicity of birefringent elements positioned adjacent that surface of said polarizing element which is adjacent the other polarizing element, each of said second named birefringent elements being parallel to and of substantially twice the width of said first named birefringent elements and imparting to one component of a beam of polarized light incident thereon a relative retardation varying substantially linearly from approximately zero adjacent one edge to substantially one wavelength adjacent the other edge, the birefringent elements in one of said multiplicities being of the opposite sign of birefringence from the said elements in the other said multiplicity, each of said birefringent elements having a principal vibration direction substantially parallel to a corresponding principal vibration direction in the other said elements and at an angle of substantially 45° to the transmission axes of said polarizing elements, the direction of said variation in retardation in both said multiplicities of the birefringent elements being the same, and means for moving said movably mounted element in a direction substantially at right angles to the length of said strip elements.

7. A variable density window comprising, in combination, frame means providing a window aperture, a plurality of sheet-like, light-polarizing elements mounted in substantially parallel, superimposed relation within said frame and overlying said aperture, at least one of said elements being mounted for parallel, linear movement with respect to the other, one of said elements comprising a multiplicity of parallel strips of substantially uniform width comprising light-polarizing material, the transmission axes of adjacent strips being relatively perpendicular, a birefringent element positioned adjacent and substantially overlying that surface of each said strip which is adjacent the other polarizing element, each of said birefringent elements imparting to one component of a beam of polarized light incident thereon a relative retardation varying substantially linearly from approximately zero adjacent one edge of said element to substantially one-half wavelength adjacent the other edge thereof, the other of said polarizing elements being of substantially uniform polarizing properties and positioned with its transmission axis respectively parallel and perpendicular to those of said polarizing strips, a multiplicity of birefringent elements positioned adjacent that surface of said polarizing element which is adjacent the other polarizing element, each of said second named birefringent elements being parallel to and of substantially twice the width of said first named birefringent elements and imparting to one component of a beam of polarized light incident thereon a relative retardation varying substantially linearly from approximately zero adjacent one edge to substantially one wavelength adjacent the other edge, the birefringent elements in one of said multiplicities being of the opposite sign of birefringence from the said elements in the other said multiplicity, each of said birefringent elements having a principal vibration direction substantially parallel to a corresponding principal vibration direction in the other said elements in the same said multiplicity and substantially perpendicular to a corresponding principal vibration direction in the said elements in the other said multiplicity, said vibration directions being at an angle of substantially 45° to the transmission axes of said polarizing elements, the direction of said variation in retardation in one of said multiplicities of birefringent elements being opposite the direction of variation in retardation in the other said multiplicity, and means for moving said movably mounted element in a direction substantially at right angles to the length of said strip elements.

MARTIN GRABAU.

CERTIFICATE OF CORRECTION.

Patent No. 2,260,220. October 21, 1941.

MARTIN GRABAU.

It is hereby certified that error appears in the printed specification of the above numbered patent requiring correction as follows: Page 4, first column, line 68, for "birefringement" read --birefringence--; page 6, first column, claim 2, line 39, for "if" read --of--; and second column, claim 4, line 45, for "element" read --elements--; and that the said Letters Patent should be read with this correction therein that the same may conform to the record of the case in the Patent Office.

Signed and sealed this 4th day of January, A. D. 1944.

Henry Van Arsdale,
Acting Commissioner of Patents.

(Seal)